Jan. 1, 1952     J. KOLBE     2,580,559
INWARDLY BANKING VEHICLE EMPLOYING FORKED BANKING ARMS
Filed March 12, 1948     4 Sheets-Sheet 1

Inventor
Joachim Kolbe
By Andrus & Scaler
Attorney

Jan. 1, 1952          J. KOLBE          2,580,559
INWARDLY BANKING VEHICLE EMPLOYING FORKED BANKING ARMS
Filed March 12, 1948          4 Sheets-Sheet 4

Inventor
Joachim Kolbe
By Andrus & Scealer
Attorney

Patented Jan. 1, 1952

2,580,559

UNITED STATES PATENT OFFICE 2,580,559

INWARDLY BANKING VEHICLE EMPLOYING FORKED BANKING ARMS

Joachim Kolbe, Sussex, Wis.

Application March 12, 1948, Serial No. 14,480

13 Claims. (Cl. 280—124)

This invention relates to vehicles wherein a superstructure is supported by wheels and wheel carriers which provide for vertical oscillation of the wheels and the cushioning of such oscillation, and which carriers, together with the wheels or by themselves, form banking arms designed for banking the superstructure toward the inside of the turn under the influence of centrifugal forces.

This application constitutes a continuation in part of copending applications Serial No. 638,210 filed December 29, 1945, now abandoned, Serial No. 642,263, filed January 19, 1946, now abandoned, and Serial No. 642,264, filed January 19, 1946, now abandoned. The invention utilizes the principles of automatically inward banking vehicles as described in the copending applications Serial No. 724,062, filed January 24, 1947, now Patent No. 2,576,686, granted November 27, 1951, and Serial No. 742,496, filed April 19, 1947.

The invention constitutes an improvement in banking arms which have been defined in the foregoing application Serial No. 724,062 individually as consisting of that part of the supporting structure of a counter banking vehicle constituting one of at least a pair of interconnected supports between the superstructure and either the road or a rigid axle, comprising a universally movable joint at one end guided in its banking movement relative to the opposite end of the arm structure in effect by an inclined hinge at said opposite end to thereby move along a predetermined path whereby the plane of the arm containing the center of the universally movable joint and the inclined hinge axis intersects the median vertical longitudinal plane of the superstructure in static position in a line passing substantially above the center of gravity of that part of the superstructure supported by said pair of supports at the point of intersection of the line with a transverse vertical plane containing the universally movable joints of the pair of supports, said banking arm structure constituting also the vertical oscillation mechanism for guiding the superstructure for vertical oscillation upon the road or rigid axle, and said universally movable joint being furnished by the tire-to-road contact in the case of an independent wheel suspension.

The invention is illustrated in its application to independent wheel suspensions for both the front and the rear of a family passenger automobile and also in its application to a rigid axle structure, and in which the suspension arms form the principal part of the banking arms.

Heretofore such banking arms included banking hinge support members, preferably attached to the superstructure and forming the inner ends of the banking arms.

One of the principal objects of this invention is to eliminate the banking hinge support members where the carriers comprise pairs of vertically spaced wheel or axle suspension arms.

Another object of the invention is to arrange separate universally movable connections between the suspension arms of each carrier and the superstructure, whereby the connections operate in two distinct turning axes, one for oscillation, the other for banking of the superstructure.

Another object of the invention is to provide banking axes for the banking arms by spacing pairs of separate universally movable connections between the carrier suspension arms and the superstructure whereby each connection serves simultaneously to effect an oscillation axis for the corresponding suspension arm of the carrier.

Another object of the invention is to provide simplified mountings employing banking arms, which utilize the lateral movement of the superstructure for actuation of the springs for the additional obtaining of an inward banking effect.

Another object of the invention is to provide a banking arm construction wherein various types of resilient means may be combined with the arrangement of universally movable joints along banking arm axes.

Another object of the invention is to combine the arrangement of ball and socket joints disposed along theoretical banking hinge axes as connecting means of the wheel suspension arms to the superstructure with provision to prevent lateral displacement of the center of mass of the superstructure by deflection of the resilient means, as the vehicle negotiates a turn.

Another further object of the invention is to provide connecting points between the wheel suspension means and resilient means, and additional connecting points between the wheel suspension means and the superstructure whereby in effect banking arms are created which maintain their lengths during banking of the superstructure.

Another object is to simplify the banking arm construction by reducing the number of parts, provide more space for engine and other superstructure parts, and reduce costs and weight of the arrangement.

Another object is to generally redistribute the functions to be performed by the parts, which form a banking arm.

Another object is to design the banking arms of the vehicle in such a manner that brake forces are transmitted over shorter routes towards the superstructure, especially where independently suspended wheels are employd.

Another object is to provide a banking arm mechanism whereby forces transmitted to the body are distributed more evenly and are directed over shorter routes, thereby facilitating the use of the so-called frameless body.

Another object is to provide a vehicle employing banking arms, which basically consist of the same number of parts necessary to build a standard independent wheel suspension.

Another object is to provide a weight distribution for the suspension parts especially suited for a banking arm arrangement with its inherent freedom of combined lateral and vertical movement for the pairs of wheels on both ends of the vehicle relative to each other, resulting in double track action with regard to long wave road surface unevenness.

Another object is to provide additional space for wider adaptation of banking arm designs to obtain varying and increased banking effects.

Other objects and advantages of the invention are set forth hereinafter.

The invention utilizes the spindle carriers and the vertically spaced suspension arms including the hinged connections therebetween, as existing in many present day vehicles, to secure sufficient rigidity in the suspension structure so as to relieve the connections between the arms and the superstructure of stresses other than those created by support and turn, and thereby makes possible the application of separate universally movable joints between each arm and the superstructure. By positioning the separate universally movable joints in the intersection of the banking arm axis and the oscillation axis for each corresponding suspension arm, the universally movable joints serve both for vertical oscillation and for banking movement of the superstructure.

The invention is illustrated in the accompanying drawings in which.

Figure 1:
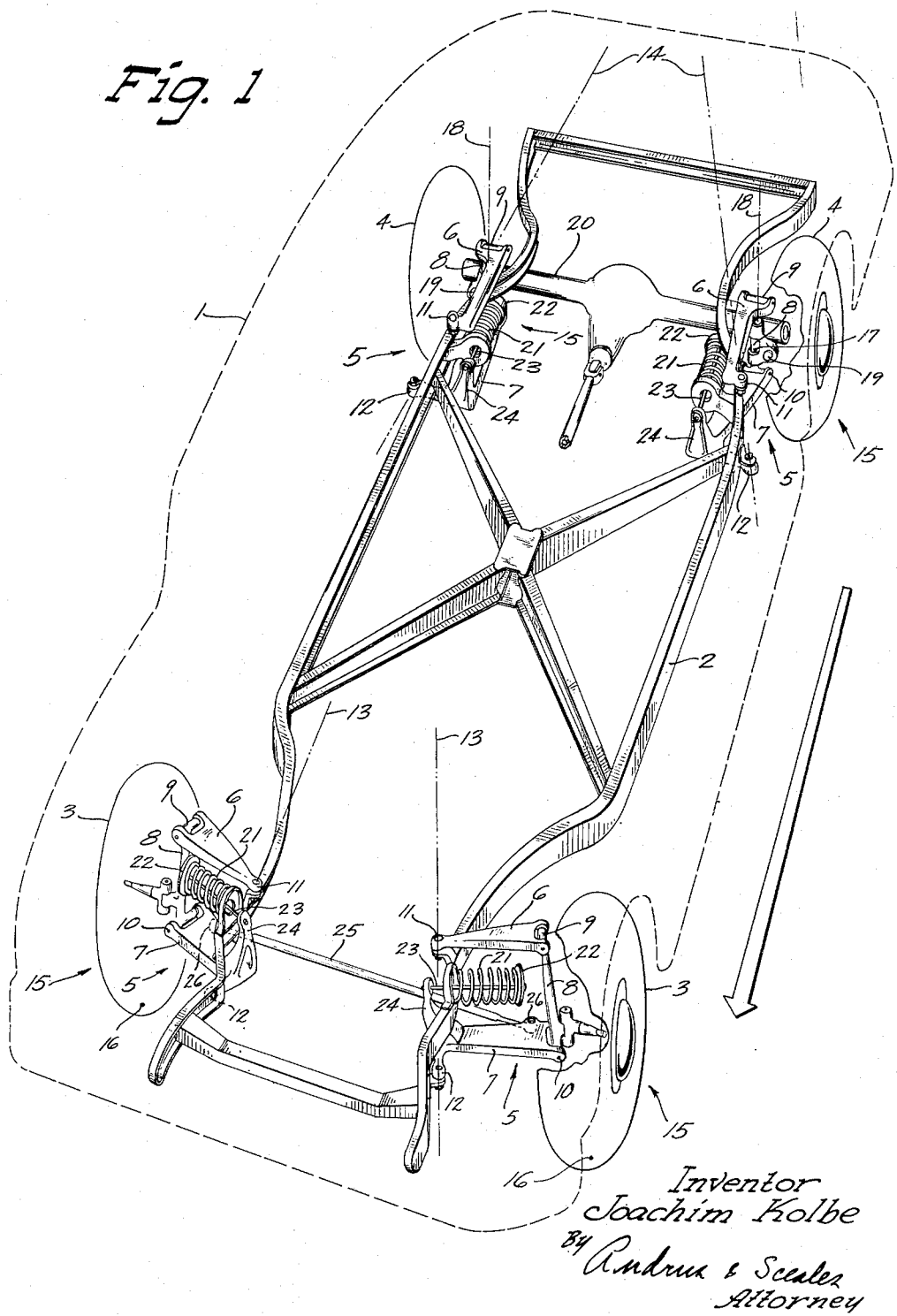
Figure 1 is a perspective view of a vehicle embodying the invention and showing the superstructure in normal upright position.

The vehicle may be any counter banking vehicle employing banking arms wherein a pair of vertically spaced suspension arms is employed for each wheel and is interposed between the vertically extending hinge support for the wheel and the superstructure. This vertically extending hinge support may either constitute the kingpin support member, as in the case of independently suspended front or rear wheels or it may be hingedly attached to a rigid axle or housing which in turn carries the wheels.

The drawings illustrate a vehicle having a superstructure or body 1 shown in dotted outlines and represented more positively as the chassis frame 2 supported upon a pair of spaced front wheels 3 and a pair of spaced rear wheels 4. The wheels are connected to the superstructure by wheel or axle carriers 5.

Each carrier 5 includes an upper wheel suspension arm 6, a lower wheel suspension arm 7, and a vertically extending hinge support 8 which is pivotally connected to the outer ends of the suspension arms 6 and 7 to turn during oscillation of the wheel on the substantially horizontally extending axes 9 and 10 for the upper and lower pivotal connections respectively.

The inner ends of the upper and lower suspension arms 6 and 7 for each carrier are attached directly to the superstructure by means of the corresponding upper universally movable joint 11 and lower universally movable joint 12. The joints 11 and 12 are arranged in substantially the same height as the hinges 9 and 10, respectively, and are located along the corresponding inclined banking hinge axis 13 for the front carriers of the vehicle and along the corresponding inclined banking hinge axis 14 for the rear carriers of the vehicle.

The inclined banking hinge axes 13 and 14 constitute the inner ends of the banking arms 15 as set forth in copending application Serial No. 724,062 referred to. The banking arms 15 are disposed in pairs corresponding to the pairs of wheels and each arm is forked and secured to the frame 2 by the two universally movable joints 11 and 12.

Figure 2:
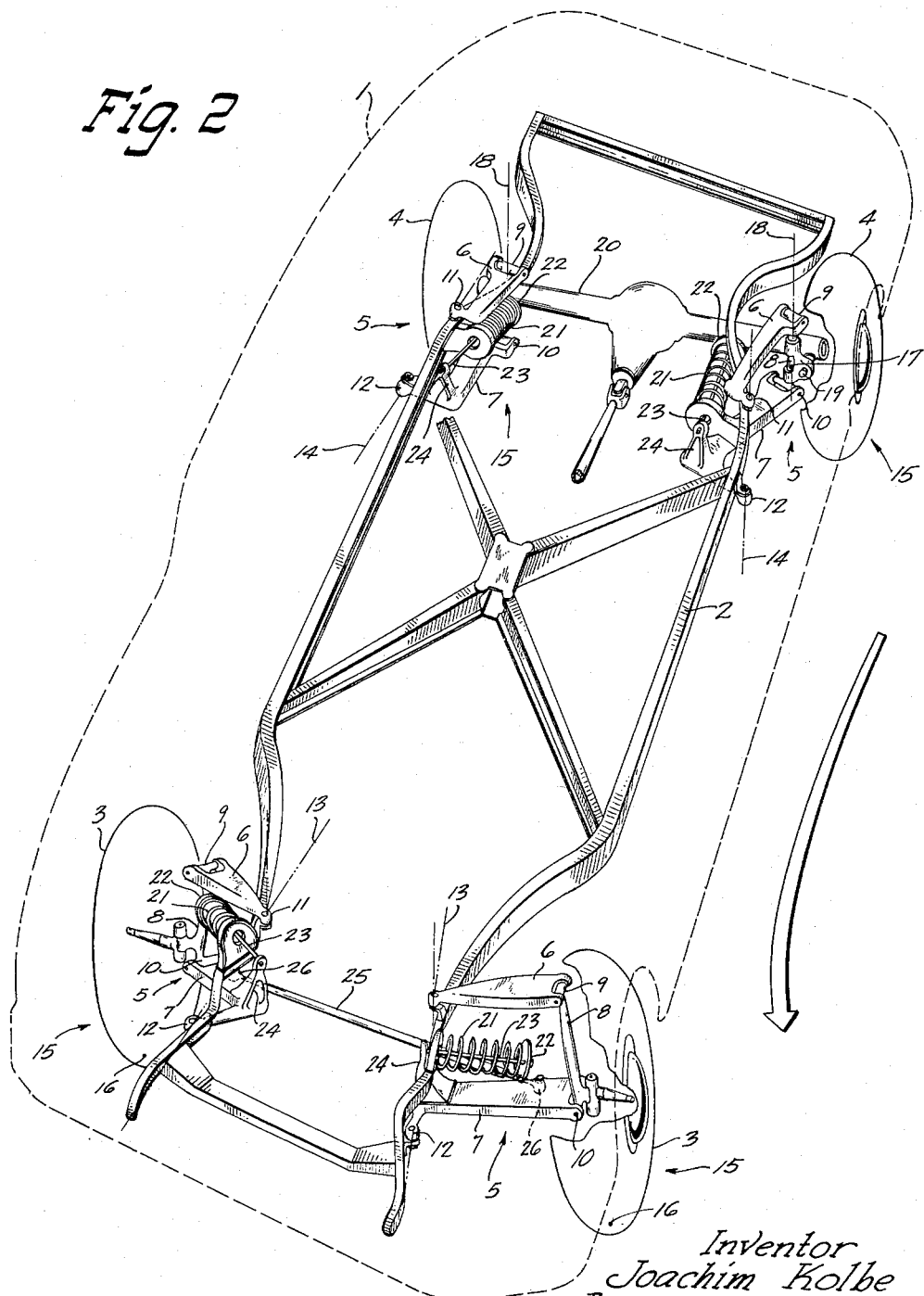
Fig. 2 is a similar view showing the superstructure in a banked position as on a turn.

The effective road contact points of the mechanism determine the outer ends of the banking arms. In the case of independently suspended wheels the road contact points 16 between tires and road constitute the outer ends of the banking arms, as shown on the front end of the vehicle illustrated in Figs. 1 and 2 and also in Figs. 3 and 4. Where a rigid axle is employed to carry the wheels, as illustrated in the rear of Figs. 1 and 2, the effective road contact point 17 for each banking arm is located along the axis 18 of the corresponding vertically extending hinge support 8 and substantially in the height of the longitudinally and horizontally extending hinge 19 which connects the vertically extending hinge support to the axle housing 20. Where a rigid axle structure is employed, as shown in the rear of the vehicle illustrated in Figs. 1 and 2, a possible position of the rigid axle inclined both to the superstructure 2 and the road is provided for by the corresponding horizontally and longitudinally extending hinges 19, enabling each end of the axle to oscillate freely.

The banking arms 15 also provide for vertical oscillation of the wheels relative to the superstructure, and for this purpose, the vertical oscillation structure may embody the principles of either the structure of application Serial No. 724,062, referred to above or of application Serial No. 742,496, also referred to above. In the former construction the vertical oscillation spring is located entirely within the banking arm and a separate device spring is employed to resist and control the banking movement. In the other construction a single spring performs both functions. In the present application only the single spring construction is illustrated.

In the construction of Figs. 1 and 2, the resilient means shown as a coil spring 21 for each front and rear banking arm is confined between the frame and a spring plate 22 and activated by an operating rod 23 extending between the spring plate 22 and the bell crank lever 24. This bell crank lever is rigidly attached to and extends upwardly from the lower suspension arm 7.

A suspension tie rod 25 interconnects the lower suspension arms 7 of the front pair of banking arms by means of ball and socket joints 26 to prevent change in spacing of the road contact points 16. In the rear the axle housing 20 serves as a suspension tie rod.

The springs 21 are disposed as set forth in copending application Serial No. 742,496 referred to above, to control vertical oscillation of the wheels by turn of the suspension arms 6 and 7 about the corresponding horizontally extending hinge axes 9 and 10 and thereby also about theoretical axes parallel to axes 9 and 10 and extending through the centers of the universally movable joints 11 and 12. The springs 21 are operated also during the turn of the banking arms 15 about their respective banking axes 13 for the front and 14 for the rear established by the selected location of the universally movable joints 11 and 12, to control banking of the superstructure.

Prior to the present invention it has been thought by the present inventor to be necessary to construct the inner end of a banking arm by employing a hinge support member which carried the banking hinge and at least one, preferably two inner oscillation hinges, especially where an oscillation quadrangle comprised of upper and lower suspension arms with a kingpin support member on the outer end and the banking hinge support member on the inner end formed a part of the banking arm for an independent wheel suspension.

The present invention utilizes the natural guiding characteristics between the suspension arms and the kingpin support member to make possible a universally movable connection between each suspension arm and the superstructure, and, by placing the two universally movable connections necessary to connect the upper and lower suspension arms to the superstructure along the inclined banking hinge axis line as established in copending application Serial No. 724,062, referred to above, secures a simpler construction for the banking arm itself.

Figure 3:
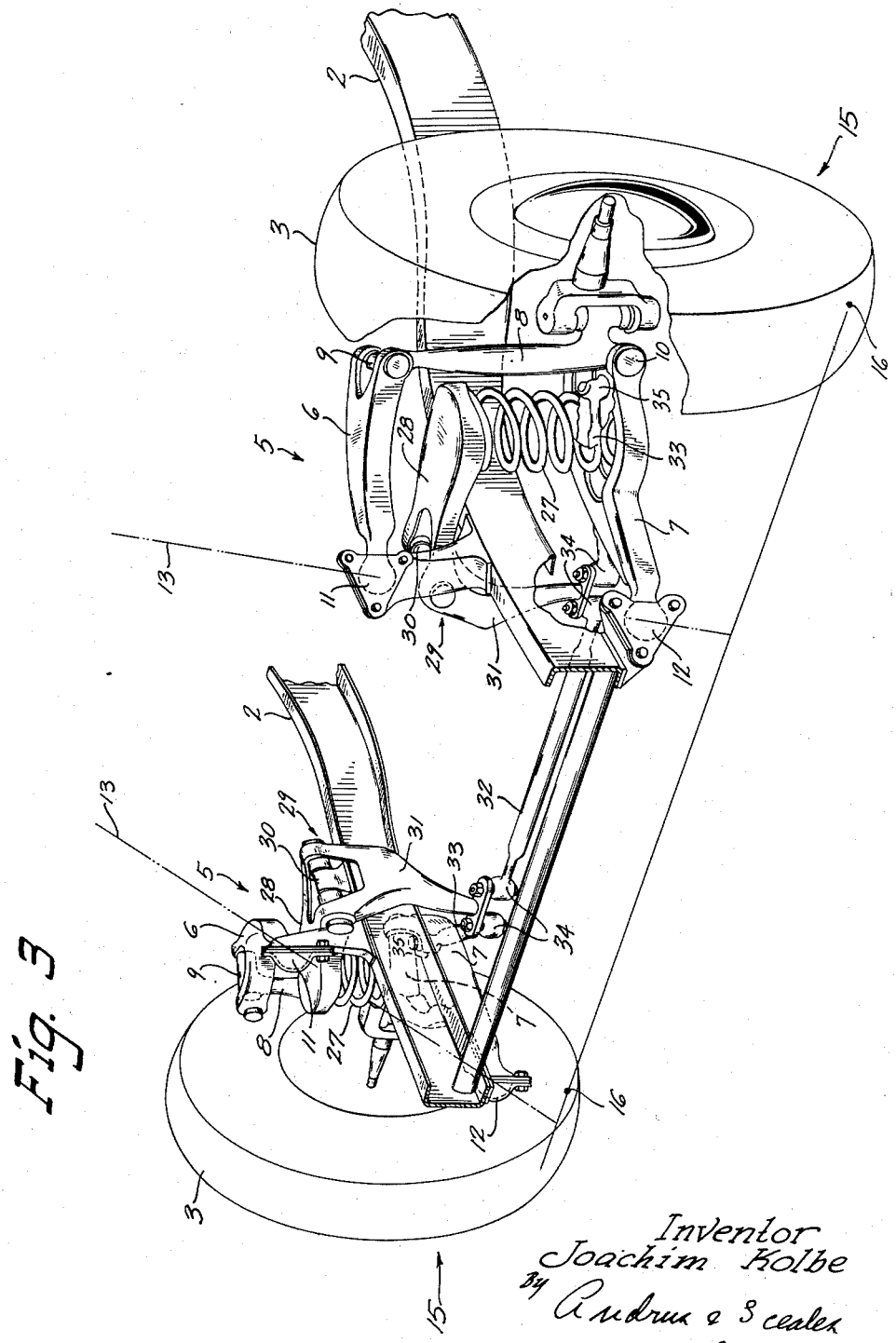
Fig. 3 is a perspective view of a front end construction showing a modified form of the invention employing bell cranks for control of the resilient means.

Referring to the embodiment illustrated in Fig. 3, a vertically extending coil spring 27 is disposed between the lower suspension arm 7 and the horizontally extending arm 28 of a bell crank lever 29 which is pivotally connected to the superstructure or frame 2 by means of a substantially horizontally extending hinge 30.

A downwardly extending arm 31 of the bell crank lever 29 is connected between a center tie rod 32 and a corresponding outer tie rod 33 by means of ball and socket joints 34. The outer end of each tie rod 33 is connected by means of a ball and socket joint 35 to the outer end of the corresponding lower suspension arm 7.

The elimination of a banking hinge support member by the arrangement of two universally movable joints, each connecting a suspension arm of a pair of such arms arranged along a banking hinge axis to form the inner end of the banking arm presents a problem where spring operating bell cranks, as described in pending application Serial No. 742,496 referred to above, are employed. The construction disclosed in Fig. 3 is an arrangement whereby the outer tie rods 33 serve the purpose of actuating the spring operating bell cranks and at the same time constitute part of the necessary suspension tie between the pair of banking arms 15. The center tie rod 32 completes this tie.

The bell crank operating arrangement described therefore differs from that disclosed in the pending application referred to in that the bell cranks are not operated by any intermediately disposed hinge support members. The arrangement has the advantage that at least the center tie rod 32 is part of the fully spring supported structure, while the outer tie rods 33 are at least partly spring supported. A more independently suspended wheel action for oscillation of the wheel is the result.

Figure 4:
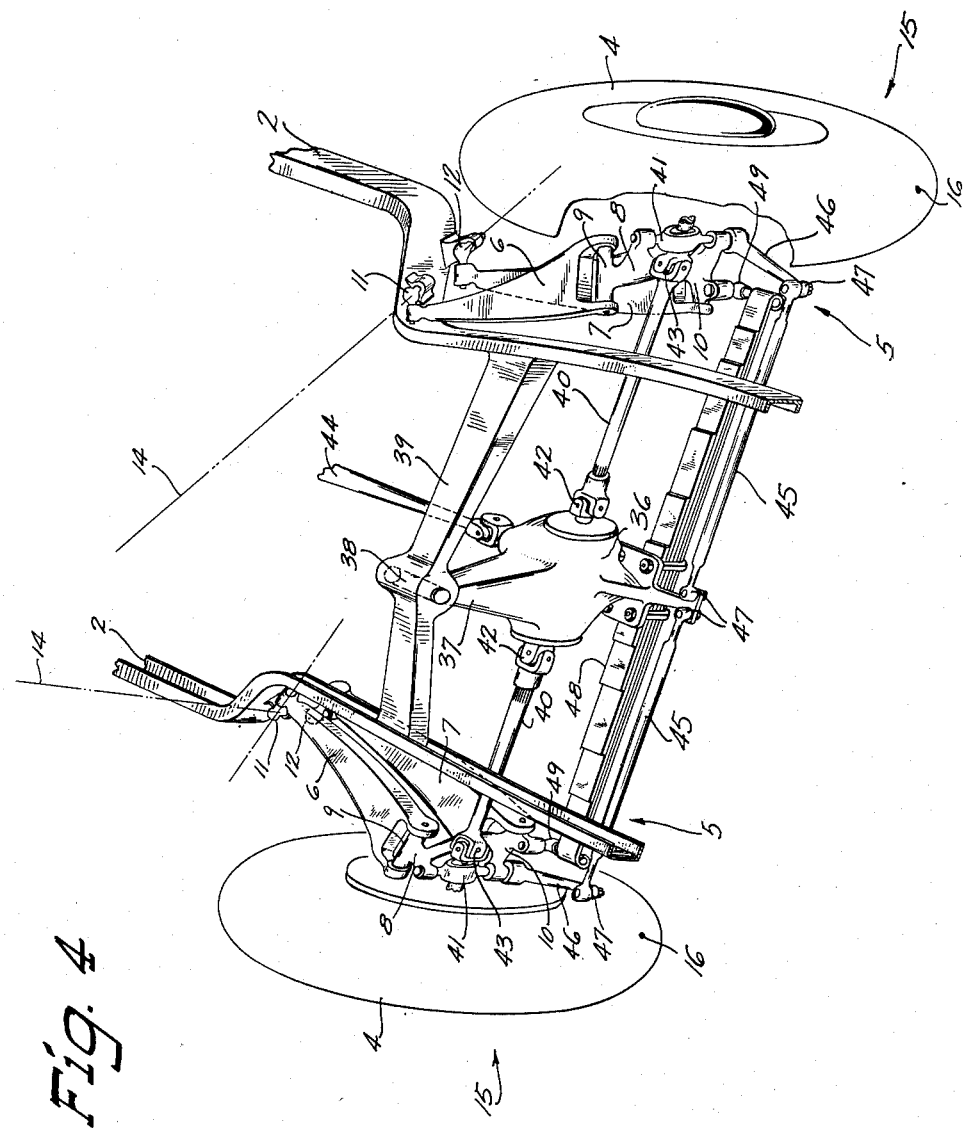
Fig. 4 is a similar view of a rear end construction showing independently suspended drive wheels.

The banking arm construction of Fig. 4 discloses an application of the invention to independently suspended rear drive wheels. Banking arm arrangements of earlier designs including separate hinge support members and applied to independently suspended rear drive wheels have been disclosed in applicant's pending application Serial No. 771,717 filed September 2, 1947. The present invention utilizes for rear drive arrangements the vertically extending hinge support 8 connecting the outer ends of the upper and lower suspension arms 6 and 7 to provide for the required torque stiffness of the banking arms 15 and thereby makes possible the elimination of separate inner hinge support members previously needed. Universally movable joints 11 and 12 connecting the arms 6 and 7 to the superstructure are arranged along the banking hinge axis. They are shown in Fig. 4 as devised to be suitable for the threaded bearing type of pivot, separating clearly the oscillation axis from the banking axis of each joint. The differential housing 36 in this construction is suspended from the superstructure by means of a vertical arm 37 extending upwardly from the differential housing and pivoted at 38 to a frame cross member 39 at a position preferably to the rear of the rear seat of the vehicle. The axis of the pivot 38 is shown horizontal and parallel to the longitudinal center line of the superstructure.

A drive shaft 40 on each side of the differential housing 36 extends to a spindle bearer 41 carried by the vertically extending hinge support 8. A universal joint 42 is disposed at the inner end of each drive shaft 40 near the differential housing, and a universal joint 43 is disposed at the outer end of each drive shaft 40 and is supported by the corresponding spindle bearer 41. The main drive shaft 44 for the differential extends forwardly to the engine.

Each wheel 4 in Fig. 4 is shown to be blocked against steering, by means of a steering tie rod 45 extending between the differential housing 36 and a steering arm 46 on the corresponding spindle bearer 41, and connected to both by means of the respective ball and socket joints 47.

A transverse leaf spring 48 is supported by the differential housing 36. It is operated by oscillation of the wheels as well as by banking of the superstructure 2, as set forth in copending application Serial No. 742,496 referred to above, and serves in addition to keep the distance substantially constant between the outer ends of the banking arms. L-shaped shackles 49 have horizontal hinges supporting the outer ends of the spring 48 and vertical hinges carried by the vertically extending hinge supports 8 to allow the described oscillation and banking movements.

One of the advantages of the invention lies in its versatility of adaptation to various designs and constructions. It provides simple inexpensive and light banking arms for inward banking of the superstructure on curves. Various resilient means may be employed including those illustrated, as set forth in the copending applications above referred to.

Various embodiments of the invention may be employed within the scope of the accompanying claims.

I claim:

1. A vehicle of the class described comprising a superstructure supported upon banking arms for inward banking on turns, and in which the banking arms are connected in pairs transversely of the superstructure to operate in unison during banking and each banking arm of at least one pair of interconnected correlated banking arms is forked at its end adjacent the superstructure to provide upper and lower substantially horizontal suspension arms pivotally hinged on spaced substantially horizontal axes at their outer ends to a wheel support member, and separate spaced universally movable connections between the inner ends of said suspension arms and the superstructure, said separate connections being disposed along a banking axis for the banking arm inclined from the horizontal and providing for turn of the suspension arms in unison about the banking axis during banking and for vertical oscillation of the wheel support member relative to the superstructure.

2. A vehicle of the class described comprising a superstructure supported upon banking arms for inward banking on turns, and in which the banking arms are connected in pairs transversely of the superstructure to operate in unison during banking and each banking arm of at least one pair of interconnected correlated banking arms is forked at its end adjacent the superstructure to provide upper and lower substantially horizontal suspension arms pivotally hinged on spaced substantially horizontal axes at their outer ends to a wheel support member, separate spaced universally movable connections between the inner ends of said suspension arms and the superstructure, said separate connections being disposed along a banking axis for the banking arm inclined from the horizontal and providing for turn of the suspension arms in unison about the banking axis during banking and for vertical oscillation of the wheel support member relative to the superstructure, and resilient means disposed between one of said suspension arms and the superstructure to cushion the vertical oscillation of the suspension arms and also control the operation of the banking arm during banking.

3. A vehicle of the class described comprising a superstructure supported upon banking arms for inward banking on turns, and in which the banking arms are connected in pairs transversely of the superstructure to operate in unison during banking and each banking arm of at least one pair of interconnected correlated banking arms is forked at its end adjacent the superstructure to provide upper and lower substantially horizontal suspension arms pivotally hinged on spaced substantially horizontal axes at their outer ends to a wheel support member and thereby constituting a carrier for the wheel, separate spaced universally movable connections between the inner ends of said suspension arms and the superstructure, said separate connections being disposed along the banking axis for the banking arm and providing for turn of the suspension arms in unison about the banking axis during banking and for vertical oscillation of the wheel support member relative to the superstructure, cushion means carried by the superstructure, and a bell crank carried by one of said suspension arms and connected to said cushion means to operate the latter during both vertical oscillation of said suspension arm and banking movement of the banking arm.

4. A vehicle of the class described comprising a superstructure supported upon banking arms for inward banking on turns, and in which the banking arms are connected in pairs transversely of the superstructure to operate in unison during banking and each banking arm of at least one pair of interconnected correlated banking arms is forked at its end adjacent the superstructure to provide upper and lower substantially horizontal suspension arms pivotally hinged on spaced substantially horizontal axes at their outer ends to a wheel support member and thereby constituting a carrier for the wheel, separate spaced universally movable connections between the inner ends of said suspension arms and the superstructure, said separate connections being disposed along the banking axis for the banking arm and providing for turn of the suspension arms in unison about the banking axis during banking and for vertical oscillation of the wheel support member relative to the superstructure, a bell crank pivotally carried by the superstructure and connected by a link at one end to said carrier to be operated by a turn at the banking axis effected by movement of the banking arm relative to the superstructure, and a spring disposed between the other end of the bell crank and the carrier to be operated by the bell crank during banking of the superstructure and by the carrier during vertical oscillation of the latter relative to the superstructure.

5. A vehicle of the class described comprising a superstructure supported upon banking arms for inward banking on turns, and in which the banking arms are connected in pairs transversely of the superstructure to operate in unison during banking and each banking arm of at least one pair of interconnected correlated banking arms is forked at its end adjacent the superstructure to provide upper and lower substantially horizontal suspension arms pivotally hinged on spaced substantially horizontal axes at their outer ends to a wheel support member, separate spaced universally movable connections between the inner ends of said suspension arms and the superstructure, said separate connections being disposed along the banking axis for the banking arm and providing for turn of the suspension arms in unison about the banking axis during banking and for vertical oscillation of the wheel support member relative to the superstructure, said wheel support member constituting a rigid vertically extending tie between said suspension arms, and a universal joint connecting the support member and the outer end of the banking arm having a substantially vertical axis of turning and a substantially horizontal axis of turning whereby the outer end of the banking arm may move in any direction relative to the superstructure under the guidance of the interconnected banking arms and of the road.

6. A vehicle of the class described comprising a superstructure supported upon banking arms for inward banking on turns, and in which at least one pair of correlated banking arms is disposed between a rigid axle structure and the superstructure and each of the banking arms of said pair is forked at its end adjacent the superstructure to provide upper and lower substantially horizontal suspension arms pivotally hinged on spaced substantially horizontal axes at their outer ends to an axle supporting member, separate spaced universally movable connections between the inner ends of said suspension arms and the superstructure, said separate connections being disposed along the banking axis for the banking arm and providing for turn of the suspension arms in unison about the banking axis during banking and for vertical oscillation of the support member relative to the superstructure, said supporting member constituting a rigid vertically extending tie between said suspension arms, and a universal joint connecting each support member and the axle structure whereby the axle structure is free to move both vertically and laterally of the superstructure under guidance of the banking arms.

7. A vehicle of the class described comprising a superstructure supported upon banking arms for inward banking on turns, and in which the banking arms are connected in pairs transversely of the superstructure to operate in unison during banking and each banking arm of at least one pair of interconnected correlated banking arms is forked at its end adjacent the superstructure to provide upper and lower substantially horizontal suspension arms pivotally hinged on spaced substantially horizontal axes at their outer ends to a wheel support member, separate spaced universally movable connections between the inner ends of said suspension arms and the superstructure, said separate connections being disposed along the banking axis for the banking arm and providing for turn of the suspension arms in unison about the banking axis during banking and for vertical oscillation of the wheel support member relative to the superstructure, said wheel support member constituting a rigid vertically extending tie between said suspension arms, and a universal joint connecting the support member and the outer end of the banking arm and having a substantially vertical axis of turning and a substantially horizontal axis of turning, said vertical axis of the universal joint providing for directional control of the wheel, and said horizontal axis of the universal joint providing for rotation of the wheel.

8. A vehicle of the class described comprising a superstructure supported upon banking arms for inward banking on turns, and in which each banking arm of at least one pair of interconnected correlated banking arms is forked at its end adjacent the superstructure to provide upper and lower substantially horizontal suspension arms pivotally hinged on spaced substantially horizontal axes at their outer ends to a wheel support member, separate spaced universally movable connections between the inner ends of said suspension arms and the superstructure, said separate connections being disposed along the banking axis for the banking arm and providing for turn of the suspension arms in unison about the banking axis during banking and for vertical oscillation of the wheel support member relative to the superstructure, said wheel support member constituting a rigid vertically extending tie between said suspension arms, a universal joint connecting the support member and the outer end of the banking arm and having a substantially vertical axis of turning and a substantially horizontal axis of turning, and a rigid tie between the correlated banking arms and serving to maintain the wheel to road contacts for the pair at a predetermined distance apart, said horizontal axis of each universal joint providing for oscillation of the outer end of the corresponding banking arm relative to the outer end of the correlated banking arm.

9. A vehicle adapted to bank inwardly on turns and comprising a superstructure and paired front and rear wheels, a wheel carrier for each of said wheels comprising two suspension arms having their inner ends connected to the superstructure by separate universally movable pivotal joints one of which is at a higher elevation than the other and disposed offset from a vertical line passing through said other, a yoke connecting the outer ends of said suspension arms, hinged joints connecting the yoke to said outer ends, and wheel supporting members carried by said yokes, the upper pivotal joints on one side of the superstructure being spaced laterally of the superstructure from those on the other side by a smaller distance than the corresponding lower pivotal joints, and the upper pivotal joints for the wheel carriers of one pair of wheels being spaced longitudinally of the superstructure from those of the other pair by a greater distance than the corresponding lower pivotal joints, whereby the superstructure is supported on the wheels and is banked in response to lateral forces acting thereon and in a direction opposite to said forces.

10. A vehicle adapted to bank inwardly on turns and comprising a superstructure and paired front and rear wheels, and a wheel carrier for each of at least one pair of said wheels comprising two suspension arms having their inner ends pivotally connected to the superstructure by separate universally movable joints at spaced points along an axis which is inclined upwardly toward the median plane of the vehicle and toward the wheel carried by the carrier, a yoke connecting the outer ends of said suspension arms, a wheel supporting member carried by said yoke and rotatable relative thereto about a substantially vertical axis, and a rigid tie member connecting the wheel supporting member to the corresponding wheel supporting member at the opposite side of the vehicle, whereby the superstructure is supported on the wheels and is banked in response to lateral forces acting thereon and in a direction opposite to said forces.

11. A vehicle adapted to bank inwardly on turns and comprising a superstructure and paired front and rear wheels, wheel carriers for each of at least one pair of said wheels comprising two suspension arms having their inner ends universally connected to the superstructure at spaced points along an inclined axis, a yoke hingedly connected at spaced points to the outer ends of said arms, a wheel supporting member carried by said yoke and rotatable relative thereto about a substantially vertical axis, a rigid tie member connecting said yoke to the corresponding yoke of the opposite wheel, a control arm pivoted to the superstructure, and a link pivotally connected at one end to the superstructure by said control arm and at the other end to said wheel supporting member at a point spaced from said substantially vertical axis to maintain the wheel in a plane parallel to the median plane of the vehicle during lateral movement of the wheel carrier about said inclined axis.

12. A superstructure inwardly banking vehicle comprising a superstructure and independently suspended rear wheels, a wheel carrier for each of said wheels comprising upper and lower suspension arms having one of their ends universally connected to the superstructure at spaced points along an inclined axis, a yoke hingedly connected to the other ends of said suspension arms at spaced points to maintain the same in predetermined relation to each other and to the vertical, a wheel supporting member mounted on said yoke and oscillatable about a substantially vertical axis relative thereto, a control arm hingedly suspended from said superstructure, and a connecting member between said control arm and a point on said wheel supporting member spaced laterally from said substantially vertical axis to maintain the plane of the wheel in predetermined relation to the median plane of the vehicle.

13. A vehicle adapted to bank inwardly on turns and comprising a superstructure and paired front and rear wheels and front and rear wheel carriers, each of said wheel carriers comprising a plurality of suspension arms connected to the superstructure by universally movable joints spaced from each other along an axis inclined both laterally and longitudinally of the vehicle, a yoke hingedly connected to the outer ends of said arms to maintain said ends in predetermined relation to each other and to the vertical, one of said arms being provided with a spring actuating member displaced from said axis, and a helical compression spring having one end fixedly related to the superstructure and the other end connected to said spring actuating member by means of an actuating rod extending axially of the spring to be stressed by movement of said arm, whereby the superstructure is supported on the wheels and is banked in response to lateral forces acting thereon and in a direction opposite to said forces.

JOACHIM KOLBE.

REFERENCES CITED

The following references are of record in the file of this patent:

UNITED STATES PATENTS

| Number | Name | Date |
|---|---|---|
| 2,152,938 | Welch | Apr. 4, 1939 |
| 2,305,795 | Schieferstein | Dec. 22, 1942 |